(12) United States Patent
Skvorecz (10) Patent No.: US 11,166,440 B2
(45) Date of Patent: Nov. 9, 2021

(54) BEEHIVE STAND WITH RAIN PROTECTED MOAT

(71) Applicant: Robert J. Skvorecz, Kinnelon, NJ (US)

(72) Inventor: Robert J. Skvorecz, Kinnelon, NJ (US)

(*) Notice: Subject to any disclaimer, the term of this patent is extended or adjusted under 35 U.S.C. 154(b) by 127 days.

(21) Appl. No.: 16/401,474

(22) Filed: May 2, 2019

(65) Prior Publication Data

US 2020/0344981 A1 Nov. 5, 2020

(51) Int. Cl.
*A01K 47/06* (2006.01)

(52) U.S. Cl.
CPC ..................... *A01K 47/06* (2013.01)

(58) Field of Classification Search
None
See application file for complete search history.

(56) References Cited

U.S. PATENT DOCUMENTS

| | | | | |
|---|---|---|---|---|
| 1,390,734 | A | * | 9/1921 | Stevens ................ A01M 29/34 43/109 |
| 2,258,317 | A | * | 10/1941 | Clipper ................ A01K 5/0142 |
| 3,090,354 | A | | 5/1963 | Merritt et al. |
| 4,856,267 | A | * | 8/1989 | Garner ................ D01H 7/86 57/58.52 |
| 5,642,687 | A | | 7/1997 | Nylen et al. |
| 7,632,167 | B1 | | 12/2009 | Miller |
| 7,886,695 | B2 | | 2/2011 | Held et al. |
| 8,413,605 | B2 | | 4/2013 | Baynard et al. |
| 9,848,595 | B1 | * | 12/2017 | Del Toro ............. A01M 29/00 |
| 2006/0141904 | A1 | | 6/2006 | Teal et al. |
| 2013/0019518 | A1 | | 1/2013 | Miller |
| 2014/0370782 | A1 | * | 12/2014 | Barton ................. A01K 47/06 |
| 2018/0064089 | A1 | | 3/2018 | Iori |

FOREIGN PATENT DOCUMENTS

JP 4856267 B1 * 1/2012

* cited by examiner

*Primary Examiner* — Joshua J Michener
*Assistant Examiner* — Henry Hooper Mudd
(74) *Attorney, Agent, or Firm* — Michael J. Feigin, Esq.; Feigin and Fridman LLC (57) ABSTRACT

A beehive stand has a basin which holds liquid such as oil which is covered by a baffle. However, the baffle is spaced apart from the basin such that the basin and baffle have an air gap there-between and are separate from each other. A centrally located vertical pole or support pole rises from the basin through a portal in the baffle and continues upwards to support another object such as a beehive. Multiple such beehive stands can be used to support or be different legs of a beehive, table, cabinet, appliance or other object especially one used outdoors. As there is no direct physical path directly upwards from the ground on which the stand is supported to the object there-above without an air space or oil, this prevents insects from climbing up from the ground to an object supported by the stand.

18 Claims, 6 Drawing Sheets

BEEHIVE STAND WITH RAIN PROTECTED MOAT

FIELD OF THE DISCLOSED TECHNOLOGY

The disclosed technology relates generally to support apparatuses and, more specifically, to a support apparatus with a rain-protected moat.

BACKGROUND OF THE DISCLOSED TECHNOLOGY

Bees are often kept in man-made beehives to provide honey for human consumption. While both a rewarding activity and source of food and nourishment working with animals has it's difficulties. One of these difficulties is dealing with competition for the honey. Insects, notably beetles, can get into the man-made beehives and contaminate the product.

What is needed is a way to protect beehives from insects. In the prior art, such protection usually comes in the form of trying to beetle-proof a hive.

SUMMARY OF THE DISCLOSED TECHNOLOGY

A beehive stand of embodiments of the disclosed technology has a basin, a support pole, and a baffle. The support pole extends from a top side of the basin and is partially surrounded by walls of the basin. The support pole can be centered in the basin and the baffle. The baffle extends from the support pole and has a wider circumference than the basin. The basin and baffle are spaced apart from one another creating an air gap between the two which prevents insects from crawling up from the ground to a beehive or other object supported by the support pole.

To prevent rain or water and other liquids or solids (such as leaves) from entering the basin, in some embodiments the baffle extends lower than an upper most extremity of the basin. The basin can have oil there-in to prevent insects such as beetles from surviving a journey into the basin and up the support pole. The baffle thus becomes inaccessible to a crawling insect because it is supported only by the support pole and the lowest portion of the support pole is submerged in oil. The support pole rests on the top side of the basin in some embodiments. The support pole can have a longitudinal (defined as extended at least 5x further in the top to bottom direction than a transverse direction) threaded piece and a transverse circular (having a longest width which is circular in shape and along a horizontal plane) support base.

The beehive stand can be used in conjunction with a plurality of beehive stands to support a beehive. It can be used by, in any order, placing the beehive stand, and more specifically, the basin, on the ground. The support pole is placed in the basin which is filled partially with oil (a viscous liquid such as one derived from petroleum, which can suffocate or kill an insect therein). The baffle is attached to the support pole as is the beehive directly or indirectly such that the stand supports the beehive or at least one leg of the beehive.

The baffle substantially prevents rain from entering into the basin in embodiments of the disclosed technology. A path of a non-flying insect from the ground to said beehive in embodiments of the disclosed technology must be by way of, in order, an outer and inner side of the basin, oil, the support pole, and then both a lower followed by an upper side of the baffle. Thus, in a method of preventing a non-flying insect from entering a beehive, a beehive is supported by way of a beehive stand which is at least partially filled or which has been filled with oil. The beehive stand is placed on the ground outdoors.

The baffle substantially prevents rain from entering into the basin in embodiments of the disclosed technology. A path of a non-flying insect from the ground to said beehive in embodiments of the disclosed technology must be by way of, in order, an outer and inner side of the basin, oil, the support pole, and then both a lower followed by an upper side of the baffle. Thus, in a method of preventing a non-flying insect from entering a beehive, a beehive is supported by way of a beehive stand which is at least partially filled or which ha been filled with oil. The beehive stand is placed on the ground outdoors.

It should be understood that when directions are used, this is respect to the ground of the Earth and/or a direction of use of the beehive stand such that the basin is at the "bottom" or below the baffle which is more towards the "top" or above the baffle. "Vertical" is moving from bottom to top or vice versa, such as the support pole having a most elongated direction in the vertical axis while the baffle is most elongated transverse thereto in the "horizontal" direction.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

A beehive stand has a basin which holds liquid such as oil which is covered by a baffle. However, the baffle is spaced apart from the basin such that the basin and baffle have an air gap there-between and are separate from each other. A centrally located vertical pole or support pole rises from the basin through a portal in the baffle and continues upwards to support another object such as a beehive. Multiple such beehive stands can be used to support or be different legs of a beehive, table, cabinet, appliance or other object especially one used outdoors. As there is no direct physical path directly upwards from the ground on which the stand is supported to the object there-above without an air space or oil, this prevents insects from climbing up from the ground to an object supported by the stand.

Embodiments of the disclosed technology will become more clear in view of the following description of the figures.

Figure 5:
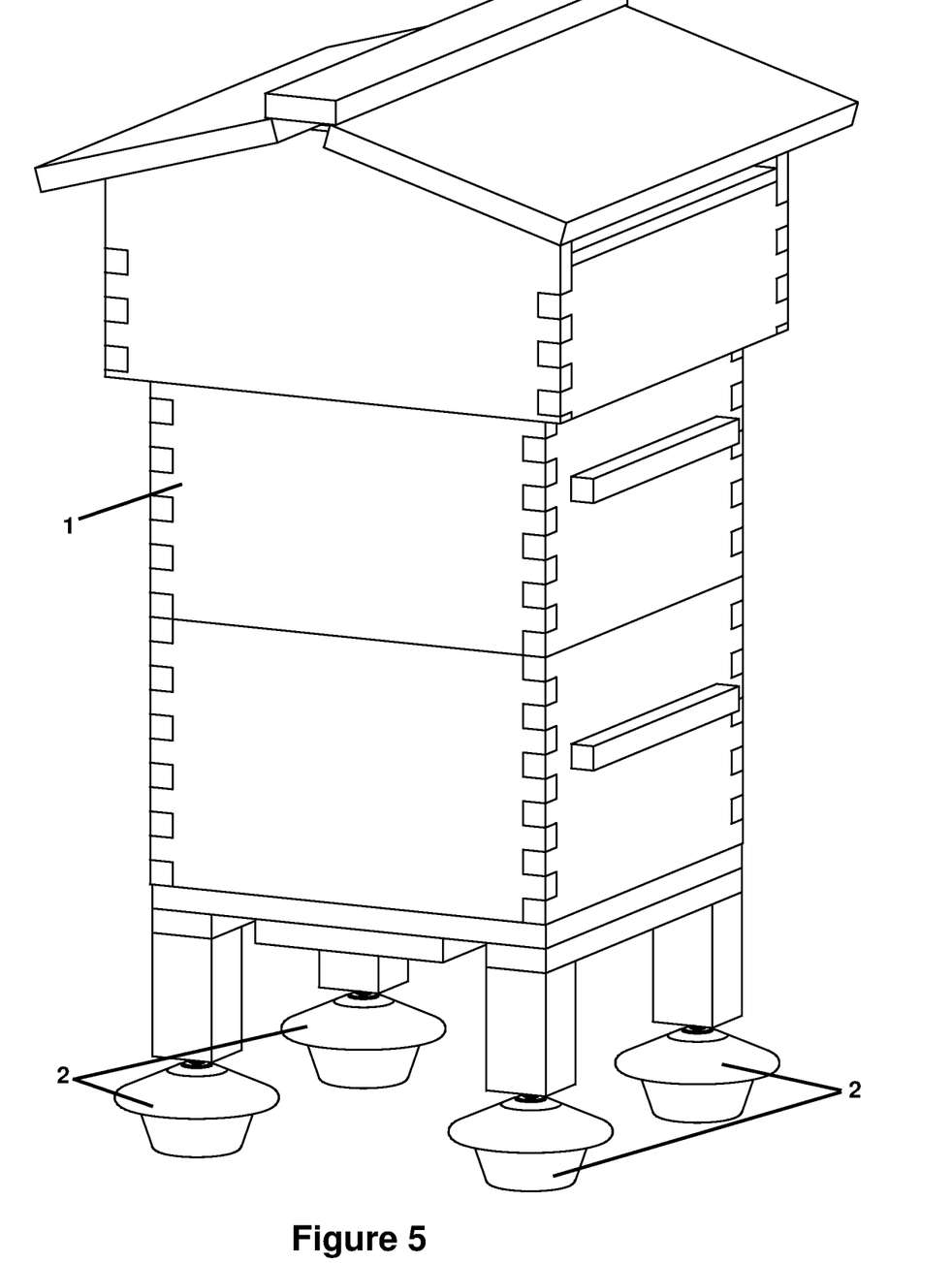
FIG. 5 shows a top perspective view of a beehive being supporting by multiple beehive stands of embodiments of the disclosed technology.
Figure 6:
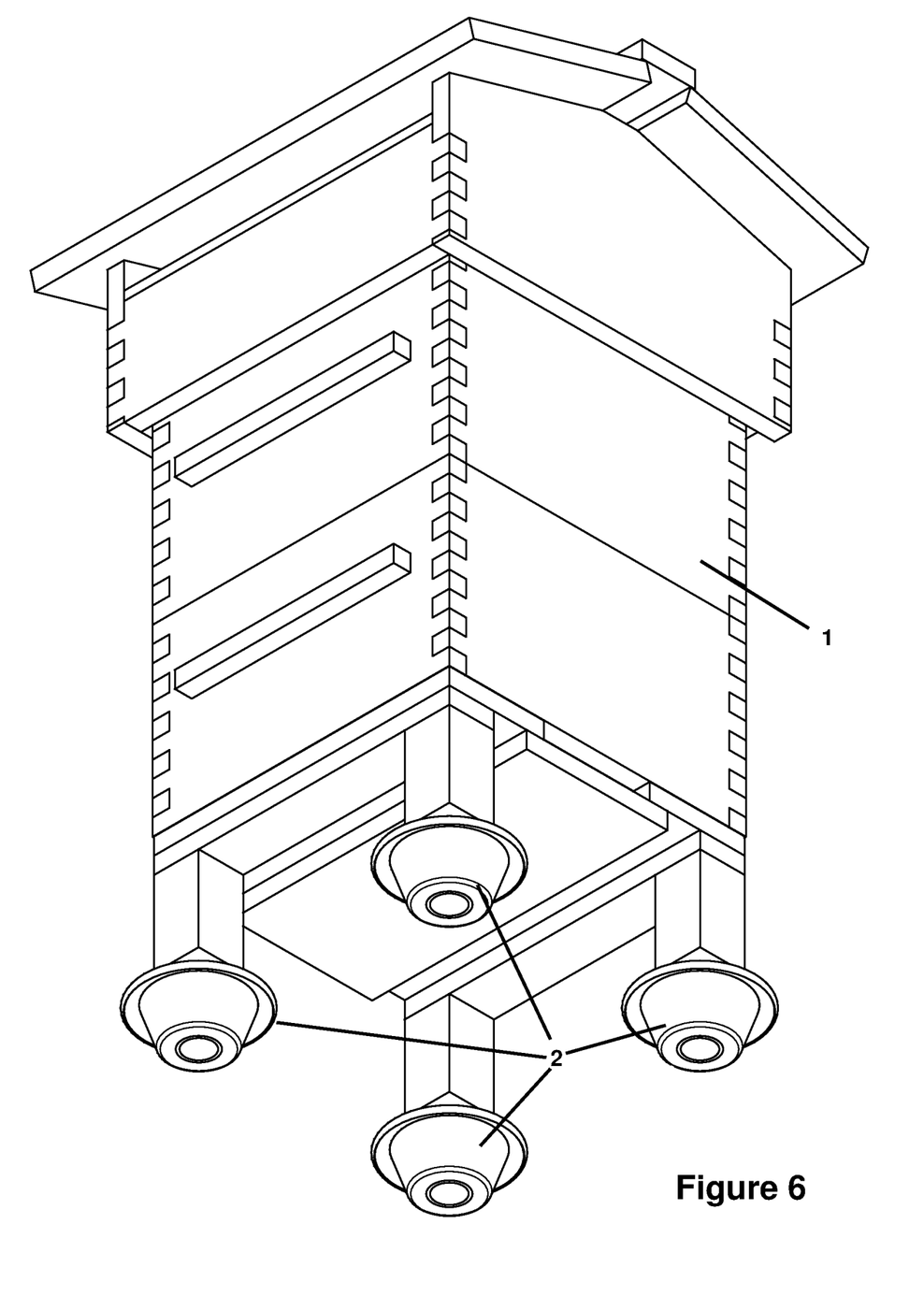
FIG. 6 shows a bottom perspective view of a beehive being supported by multiple beehive stands of embodiments of the disclosed technology.

Referring first to FIGS. 5 and 6, the overall use of the device is seen in an embodiment of the disclosed technology. FIG. 5 shows a top perspective view of a beehive being supported by multiple beehive stands of embodiments of the disclosed technology. FIG. 6 shows a bottom perspective view of a beehive being supported by multiple beehive stands of embodiments of the disclosed technology. Here, a beehive 1 has side walls, a top roof, and bees inside. This beehive is representative of any device or object which is supported by one or more legs as the embodiments of the disclosed technology can be used with any such device or object. The stands 2 are shown there-below supporting the beehive. These stands are thus called "beehive stands" though the stands should not be construed as limited to supporting beehives. Note that a different stand 2 can be used for each leg as shown (being the leg or a part thereof) as shown to support a device. One stand can be used by itself in some embodiments of the disclosed technology.

Figure 4:
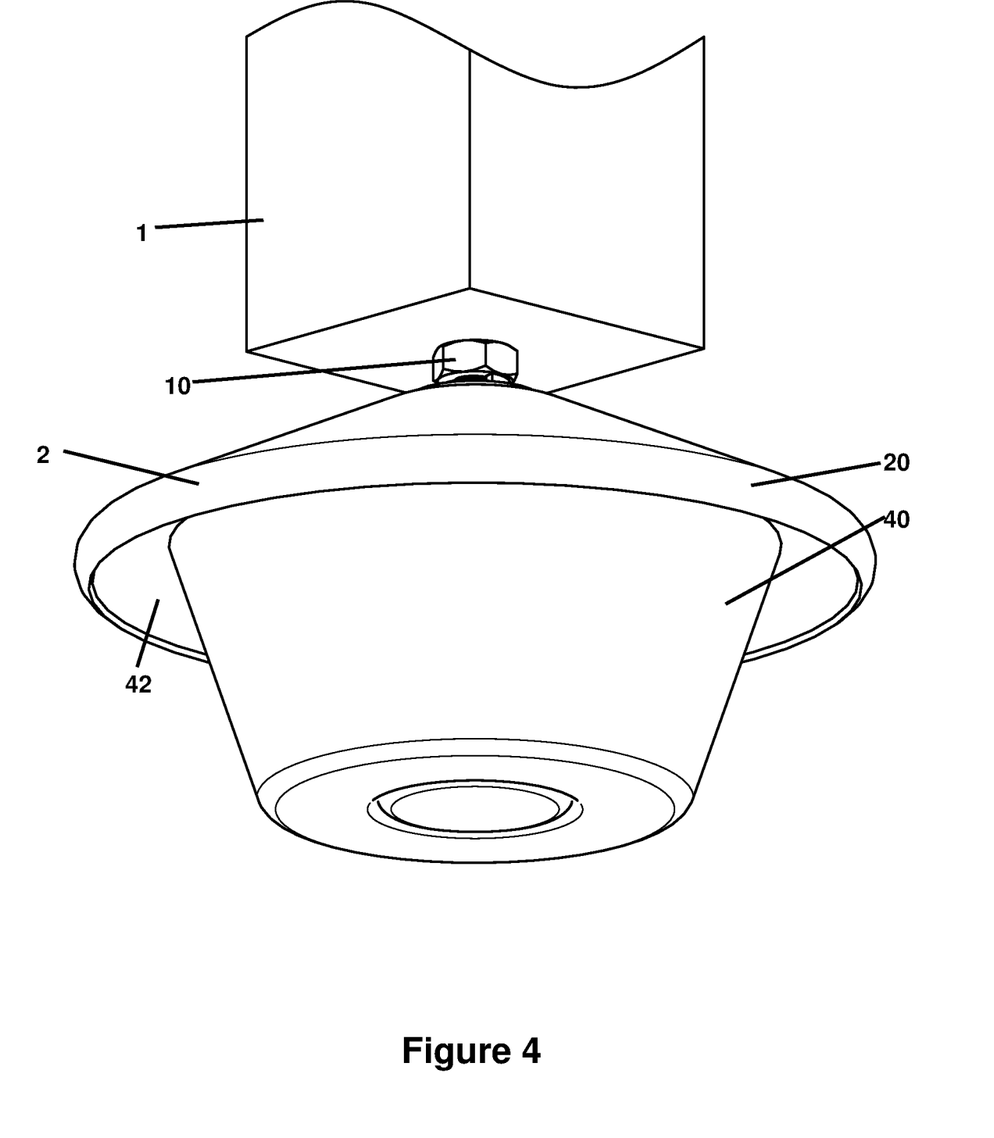
FIG. 4 shows a bottom perspective view of a beehive stand supporting a beehive in an embodiment of the disclosed technology.

Viewed more closely, FIG. 4 shows a bottom perspective view of a beehive stand supporting a beehive in an embodiment of the disclosed technology. Here one can see the beehive stand 2 has a lower basin 40 covered by a baffle 20 supporting a leg of the beehive 1. An air gap 42 is situated outside of the basin 40 and under a portion of the baffle 20, the baffle being wider than the basin. The air gap extends between the basin and baffle as the basin and baffle are spaced apart from each other and in embodiments, lack direct contact with one another. Described another way, a top edge of the basin has a circumference which is smaller than the widest circumference of the baffle. When the baffle and basin are circular or substantially circular the circumference is defined as the distance around the circle or normalized version of the circle. The baffle and basin can be centered with respect to one another with a vertical pole or support pole extending upwards partially/fully through each as will be described below. The female connector 10 seen in this figure is surrounding part of such a vertical pole.

Moving backwards through the figures still but skipping FIG. 3, the second figure is now described. FIG. 2 shows a blown apart perspective view a of beehive stand of embodiments of the disclosed technology. In the spirit of describing backwards, FIG. 2 will be described from the bottom to top. At the bottom most extremity of the beehive stand 2 is a basin 40. This basin is a vessel which holds liquid, or at least, viscous liquid and/or has a pouch or lining therein which does so or the equivalent. The basin can have a flat bottom and vertical (perpendicular) side, substantially thereso, or as shown, a side which is part of a conical section and expands outwards from the bottom towards the top. In this basin is attached or placed a vertical pole 30 which can rest on a top side of the basin, be screwed into or fastened into the basin, or otherwise abuts the basin 40. A disc 32 can also interpose between the vertical pole 30 and the basin 40 such that the disc 32 is wider horizontally than the pole 30 in order to provide more stability. The disc 32 can also fit within upward projections in the top side of the basin 40 to prevent sliding in a horizontal direction. One can then fill the basin partially or fully with a liquid such as oil (see FIG. 1 and the description thereof).

A baffle 20 is supported by the support pole 30. The support pole extends through a center portal of the baffle 20 in embodiments of the disclosed technology while the baffle 20 and support pole 30 are held in place relative to each other. This can be by way of threading on each of the devices, or as shown, by using washes and female connectors on either side of the baffle 20. In FIG. 2 a female connector 24 (such as a "nut") is threaded on the support pole 30 by way of matching threads on the connector 24 and the support pole 30. A washer 22 has a larger circular circumference to spread out the pressure applied between the baffle 20 and female connector 20 and is in contact/squeezed between the female connector 24 and baffle 20. Above the baffle 20 the same is in reverse with a washer 14 squeezed/abutted between the baffle 20 and a female connector 10. A tension ring 12 is also placed between the female connector 10 and washer 14 in embodiments of the disclosed technology. In this manner the baffle is suspended above the basin 40 by being held in place at an elevation by the support pole 30.

Figure 3:
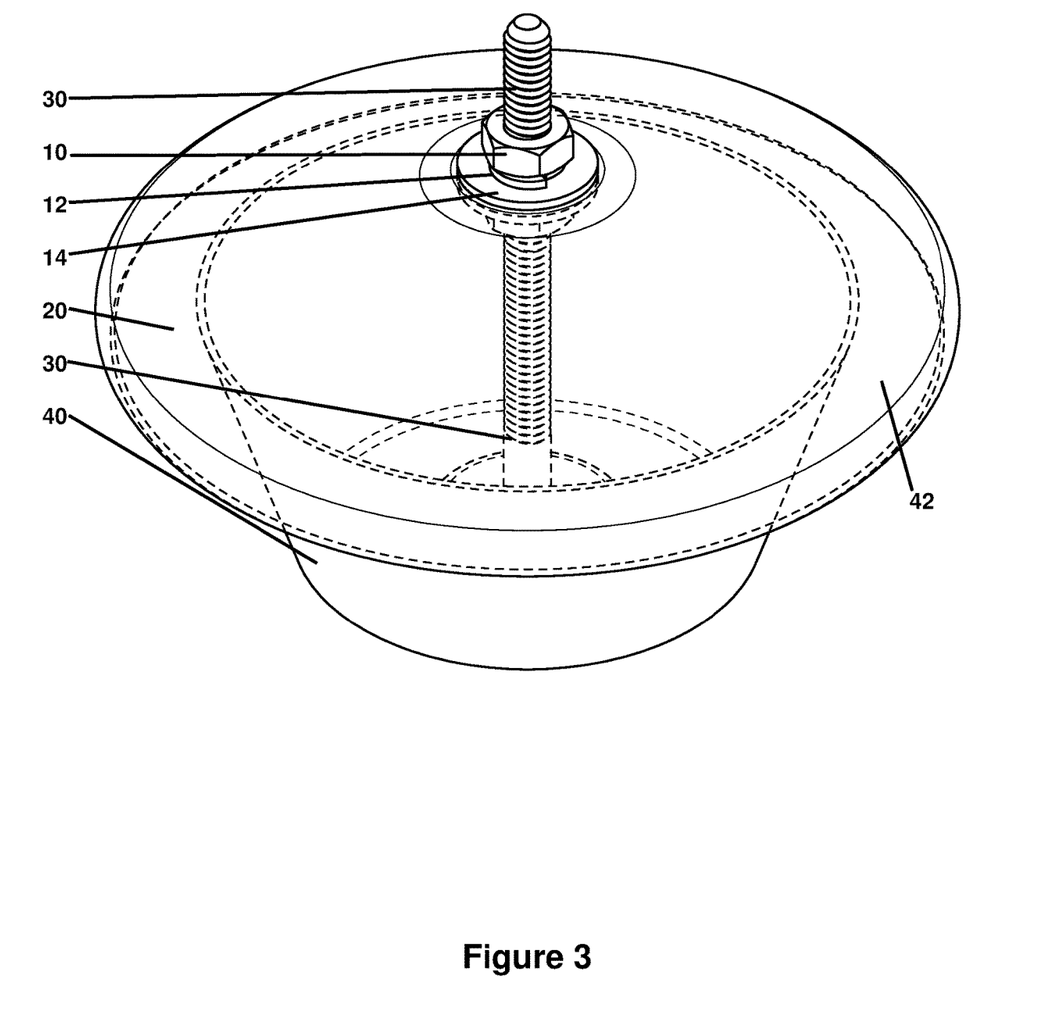
FIG. 3 shows a closed perspective view a beehive stand of embodiments of the disclosed technology.

Now returning to the previously-skipped FIG. 3, FIG. 3 shows a closed perspective view of a beehive stand of embodiments of the disclosed technology. The basin 40 is below the baffle 20. The vertical pole 30 is abutting a top side of the bottom of the basin 40 and extends upwards through the baffle 20 such that the baffle 20 is held in place relative to the support pole 30 and basin 40. Referring now to the devices circumferentially, that is, from inside to out and starting at the center, a joint vertical center or substantially a same center along the Y axis is shared by the basin 40, support pole 30, and baffle 20 in some embodiments of the disclosed technology. At a top most extremity of the basin 40, at it's outer edge is a ring or circle is formed above which is part of the air gap 42 as, at this circumferential location, the baffle 20 is higher/above/spaced-apart from the basin 40. However, moving outwards to a greater diameter/radius, the elevation of the baffle drops in some embodiments of the disclosed technology such that the outer edge of the baffle is lower than the top edge of the basin in such embodiments. As such, there is an air gap 42 between the basin 40 and baffle 20 and the basin/baffle remain out of contact with each other in embodiments of the disclosed technology.

Still referring to FIG. 3, note that the additional hardware described with reference to FIG. 4 is tightened to keep the baffle 20 in place above the basin 40. That is one can see the female connector 10 tightened against the tension ring 12 and washer 14 preventing the baffle 20 from rising vertically while the female connector 24 prevents the baffle from moving lower in the Y axis. It should be understood that "up" and "down" are directions in the Y axis and refer to the direction the objects are shown in FIG. 1 with respect to the top of the page being "up" and the bottom of the page being "down".

Figure 1:
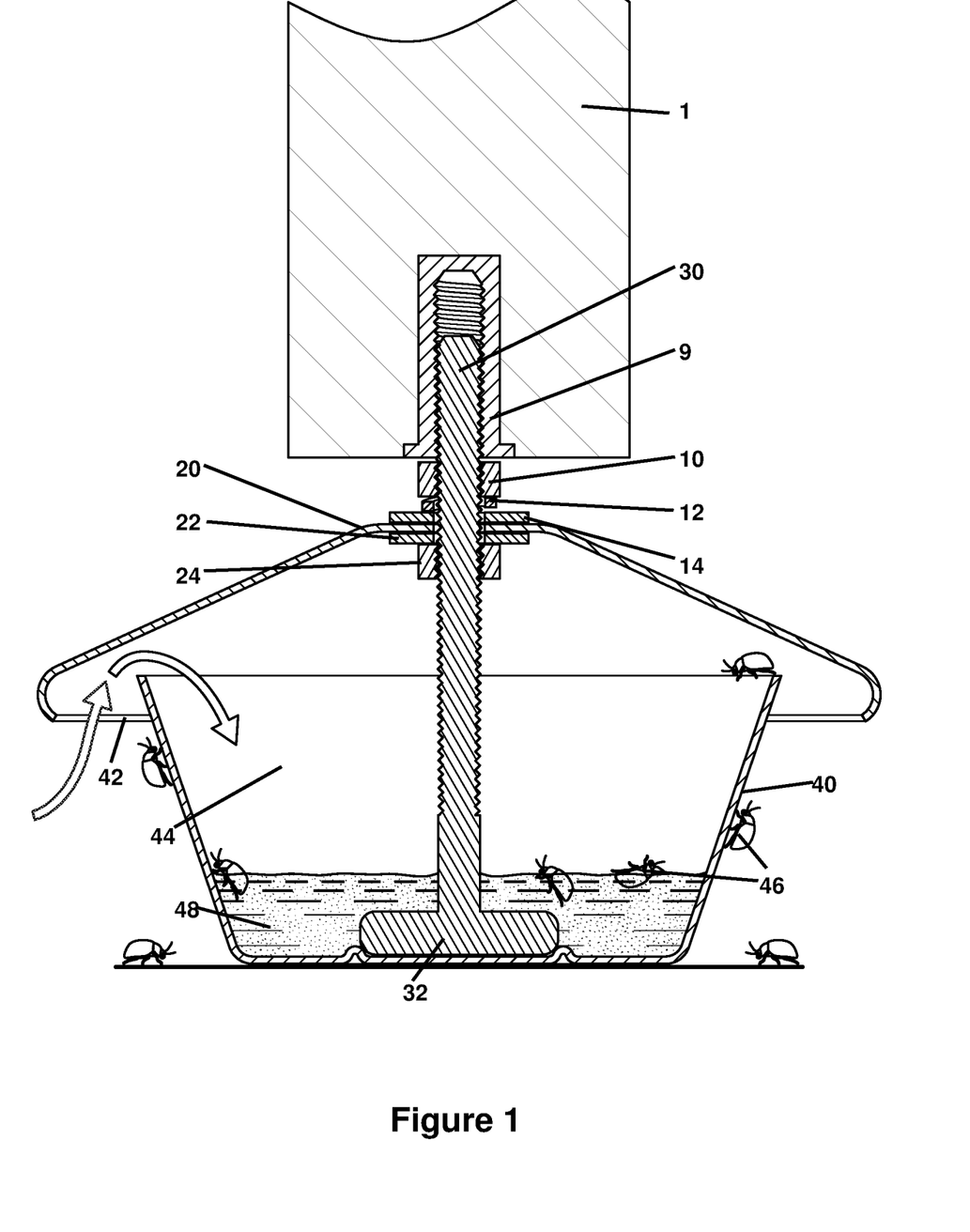
FIG. 1 shows a cutaway elevation view of a beehive stand of embodiments of the disclosed technology.
Figure 2:
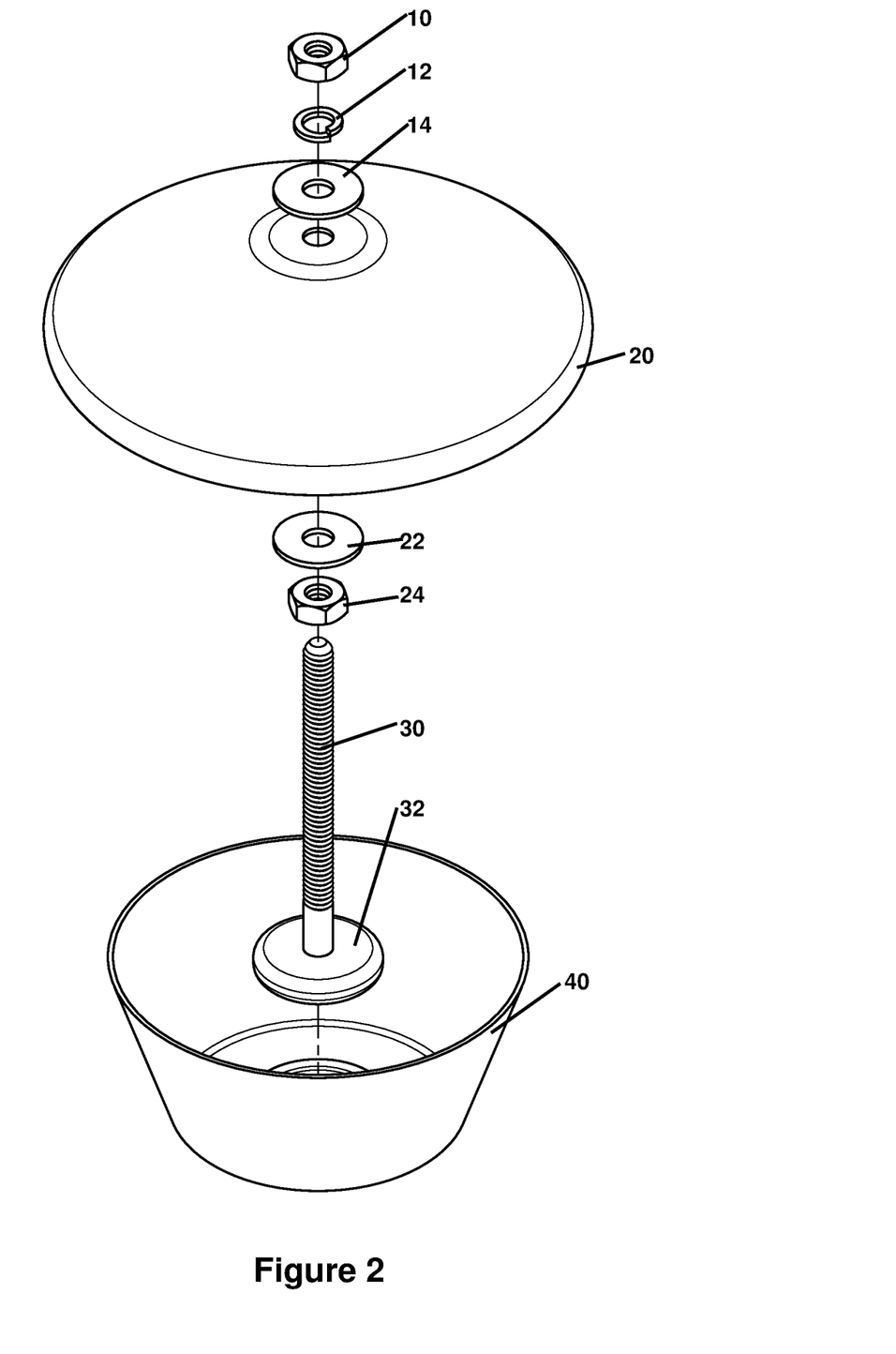
FIG. 2 shows a blown apart perspective view a beehive stand of embodiments of the disclosed technology.

Finally, FIG. 1 shows a cutaway elevation view of a beehive stand of embodiments of the disclosed technology. Oil 48 is placed into the basin 40 partially filling the basin while atmospheric air 44 flows into and out of the basin by way of the air gap 42 between the basin 40 and baffle 20. Note that the baffle 20 extends downwards further than the basin 40 extends upwards but neither is in contact/touches the other. The baffle 20 is suspended and supported by the support pole 30 which, in this embodiment, rests on the inside surface of the basin by way of the stand 32 which is held within upwardly extending flanges on the bottom side of the basin to prevent horizontal sliding (X-axis) of the support pole 30. The baffle 20 is held at it's height and in place with respect to the support pole 30 by way of female connectors 10 and 24 which squeeze a tension ring 12 and washers 14 and 22 against the top and bottom sides of the baffle, respectively.

This arrangement allows the baffle to prevent rain, leaves, and other devices from entry into the basin 40. This is advantageous over simply having a basin with water or another liquid because one need not (or less often must) change the water, clean debris, and so forth. However, air can circulate preventing the mold and bacteria from accumulating. The oil is inert and generally harmful to the growth of bacteria, mold, and of course, insects. In this manner, by way of the covered basin, the oil 48 remains substantially or fully undiluted and uncontaminated for at least a month, six months, year, or many years after the beehive stand 2 is put into place supporting a beehive 1.

Note that in order for an insect such as a beetle 46 or any other walking creature to climb up to the beehive 1 by way of the beehive stand 2, it would need to crawl along the outside of the basin 40, over the top edge thereof and down the inside wall of the basin 40. Once inside, it would then have to crawl through the oil where it would presumably perish before reaching the vertical pole 30. Even if the insect survived the oil and made it to the vertical pole 30, it would then have to climb vertically straight up the pole (albeit, potentially on threads of the pole) before reaching a horizontally disposed female connector 24 forcing the insect to make a right angle and upside down turn. While possible for some insects, the insect would then have to move outwards from the center all the way to the underside of the baffle 20. At this point, the insect would see light and presumably drop to the ground rather than have to make more than a 180 degree turn around the rounded edge of the baffle 20 which slopes inwards in some embodiments, to the upper side of the baffle. In some embodiments the entire beehive stand can be made larger and hold bird feeders and the like to prevent squirrels from climbing upwards.

Referring still to FIG. 1, in some embodiments at an upper portion of the vertical pole 30, the pole enters into and is surrounded by the beehive 1. A female threaded or threaded interior space 9 or other connecting region can be used to connect the vertical pole 30 to the beehive 1.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A beehive stand, comprising:
   a basin;
   a support pole extending from a top side of said basin and partially surrounded by walls of said basin and including a longitudinal threaded portion; and
   a baffle extending from said support pole, said baffle having a wider circumference than said basin and spaced apart above said basin creating an air gap between said basin and said baffle, said baffle is secured to said support pole by a an upper washer disposed above said baffle and a lower washer disposed below said baffle, and by female fasteners screwed onto said longitudinal threaded portion of said support pole above said upper washer and below said lower washer, wherein said baffle extends lower than an upper most extremity of said basin, and wherein said baffle is supported solely by said support pole and said support pole rests on said top side of said basin.

2. The beehive stand of claim 1, wherein said basin contains oil.

3. A method of using said beehive stand of claim 2, comprising in any order:
   placing said basin on ground, placing said support pole in said basin, filling said basin partially with oil, attaching said baffle to said support pole, attaching a beehive to said support pole directly or indirectly.

4. The beehive stand of claim 1, wherein said support pole is integrally formed with a transverse circular support base, distal to said longitudinal threaded portion.

5. The beehive stand of claim 1, wherein said beehive stand is functionally associated with a plurality of beehive stands to support a beehive.

6. The beehive stand of claim 1, wherein said support pole further supports a beehive above said baffle.

7. The beehive stand of claim 1, wherein said basin is partially filled with oil.

8. The beehive stand of claim 1, wherein said basin, said support pole, and said baffle are centered with respect to one another in a vertical plane.

9. The beehive stand of claim 1, wherein said transverse circular support base is disposed within projections extending upwardly from said top side of said basin, thereby to prevent sliding of said support pole in a horizontal direction relative to said basin.

10. The beehive stand of claim 1, wherein said baffle has a horizontal circular cross-section and a convex vertical cross-section, the horizontal circular cross-section having a greater perimeter than a circular opening of said basin.

11. A beehive stand, comprising:
   a basin having a circular opening on a top side;
   a baffle with a horizontal circular cross-section and with a convex vertical cross-section, the horizontal circular cross-section having with a greater perimeter than said circular opening of said basin substantially centered above said basin, said perimeter of said baffle extending lower than said circular opening of said basin; and
   a support pole extending between said basin and said baffle, wherein said baffle is supported only by, and connected only to, said support pole, wherein at least a majority of said support pole is threaded, and wherein said baffle is secured to said support pole by a an upper washer disposed above said baffle and a lower washer disposed below said baffle, and by female fasteners screwed onto said longitudinal threaded portion of said support pole above said upper washer and below said lower washer.

12. The beehive stand of claim 11, wherein said baffle substantially prevents rain from entering into said basin.

13. The beehive stand of claim 11, wherein a path of a non-flying insect from the ground to said beehive is by way of an outer and inner side of said basin, oil, said support pole, and both a lower and upper side of said baffle.

14. A method of preventing said non-flying insect of claim 13 from entering a beehive, comprising steps of supporting a beehive by way of said beehive stand, at least partially filling said basin of said beehive stand with oil, and placing said beehive stand and said basin on ground outdoors.

15. The beehive stand of claim 11, wherein said support pole is centered horizontally with respect to said basin and said baffle.

16. The beehive stand of claim 11, wherein said support pole is integrally formed with a transverse circular support base, distal to said longitudinal threaded portion, and said transverse circular support base is disposed within projections extending upwardly from a top surface of said basin, thereby to prevent sliding of said support pole in a horizontal direction relative to said basin.

17. A beehive stand, comprising:
   a basin;
   a support pole extending from a top side of said basin and partially surrounded by walls of said basin, said support pole being integrally formed with a transverse circular support base and said transverse circular support base is disposed within projections extending upwardly from said top side of said basin, thereby to prevent sliding of said support pole in a horizontal direction relative to said basin; and
   a baffle extending from said support pole, said baffle having a wider circumference than said basin and spaced apart above said basin creating an air gap between said basin and said baffle,
   wherein said baffle extends lower than an upper most extremity of said basin, and
   wherein said baffle is supported solely by said support pole and said support pole rests on said top side of said basin.

18. The beehive stand of claim 17, wherein said support pole includes a threaded portion distal to said transverse circular support base, and wherein said baffle is secured to said support pole by a an upper washer disposed above said baffle and a lower washer disposed below said baffle, and by female fasteners screwed onto said longitudinal threaded portion of said support pole above said upper washer and below said lower washer.

* * * * *